United States Patent Office 2,724,603
Patented Nov. 22, 1955

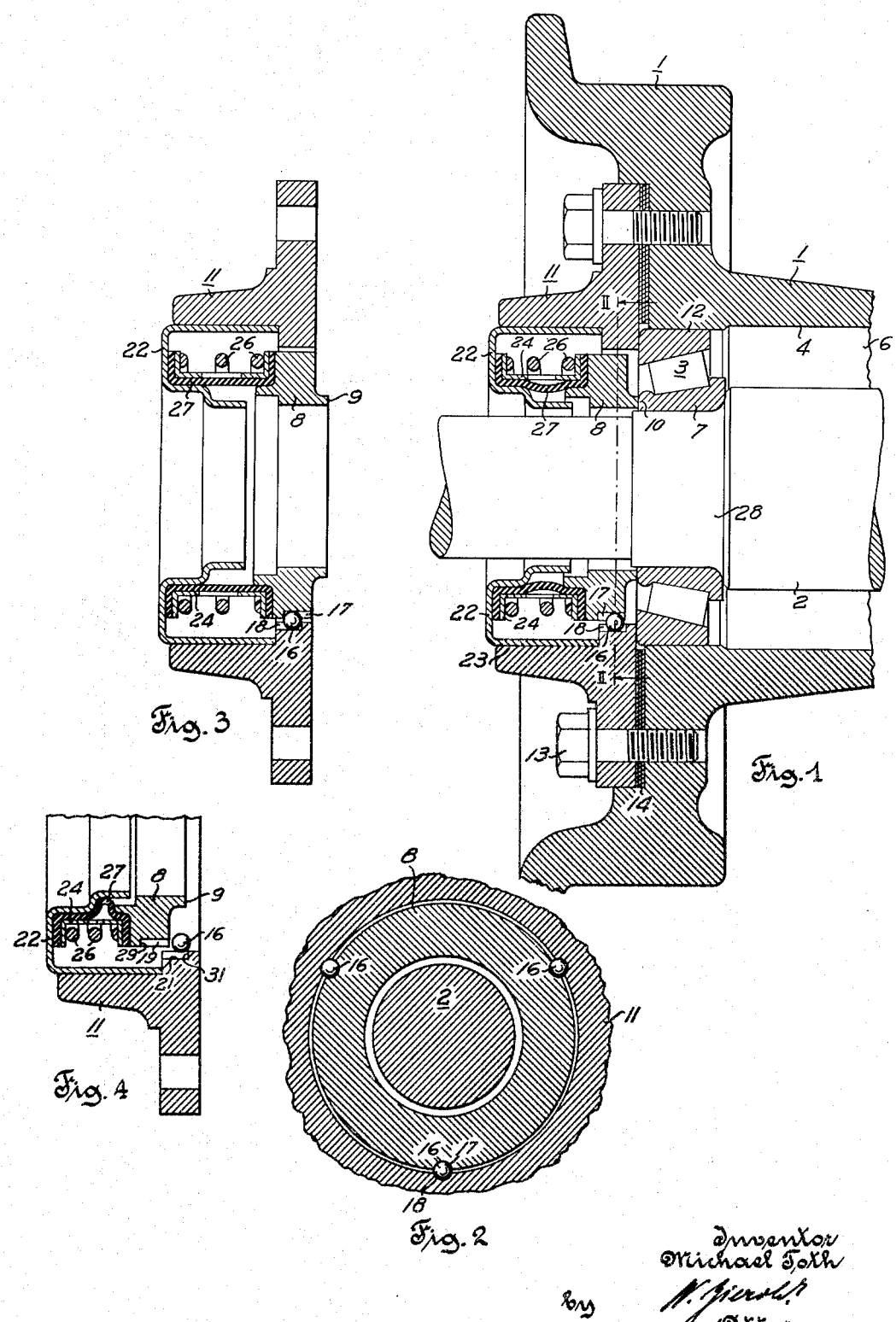

2,724,603

AXIAL CONTACT SEAL

Michael Toth, Springfield, Ill., assignor to Allis-Chalmers Manufacturing Company, Milwaukee, Wis.

Application February 21, 1951, Serial No. 212,071

3 Claims. (Cl. 286—11.14)

The invention relates to rotary seals of the axial contact type, that is, seals of the type in which an axially movable sealing ring has a sealing surface at one side for cooperative engagement with a complementary sealing surface, and in which a resilient backing unit is arranged at the other side of the sealing ring and urges it axially into cooperative engagement with said complementary sealing surface.

A copending application, Serial No. 781,668 filed on October 23, 1947, by Bernard J. Murphy for Axial Contact Seal, now U. S. Patent 2,685,464 issued August 3, 1954, discloses a seal of the above mentioned character in which a circumferential series of balls between the sealing ring and a supporting structure permit substantially frictionless axial back and forth movement of the ring relative to the supporting structure, and in which the balls are pocketed partly in the sealing ring and partly in the supporting structure so that the balls will not only support the sealing ring for axial back and forth movement but also center the ring accurately and prevent it from rotating on its axis relative to the supporting structure.

The supporting structure, the sealing ring, the backing unit and the ring mounting balls represent a multiplicity of parts whose installation at the desired location may be greatly facilitated by preassembling all of these parts into a compact self-contained unit which can be handled conveniently and installed, in assembled condition, on the machinery or apparatus where it is to be used. In such a self-contained seal unit, provisions must be made to prevent separation of the supporting structure and of the sealing ring from each other, and also to prevent accidental loss of the ring mounting balls during handling of the unit prior to and during its installation at its place of intended use.

The principal object of the present invention is to provide a seal unit of the hereinabove outlined character in which the requirement of preventing separation of the supporting structure and of the sealing ring from each other, and the requirement of preventing accidental loss of the balls are taken care of in a simple and entirely satisfactory manner.

Another object of the invention is to provide a seal unit of the hereinabove outlined character, in which the supporting structure, sealing ring and backing unit are arranged and interrelated so that the ring mounting balls may readily be installed in and removed from the positions in which they are operative to mount the sealing ring in axially shiftable, radially centered and circumferentially locked condition on the supporting structure.

These and other objects and advantages are attained by the present invention, various novel features of which will be apparent from the description herein and the accompanying drawing disclosing an embodiment of the invention, and will be more particularly pointed out in the appended claims.

Referring to the drawing:

Fig. 1 is a sectional view of part of a track roller installation for crawler tractors;

Fig. 2 is a sectional view on line II—II of Fig. 1;

Fig. 3 is a sectional view of a self-contained seal unit incorporating parts shown in Fig. 1, Fig. 3 showing the seal unit in a different condition of axial expansion than that in which it is shown in Fig. 1; and Fig. 4 is a partial view of the seal unit shown in Fig. 3 and illustrates a procedural step in the assembly and disassembly of the seal unit.

In the assembly of parts shown in Fig. 1, a wheel 1 forms part of a conventional track roller for crawler tractors, and a supporting shaft for the roller is generally designated by the reference character 2. In conformity with accepted practice, the shaft 2 extends through an interior hollow space of the track roller and has opposite end portions, not shown, for connection with a track frame in conventional manner. The reference character 3 generally designates one of a pair of conical roller bearings by means of which the track roller is rotatably mounted on the shaft 2 in conventional manner. An interior cylindrical surface 4 of the roller is radially spaced from the shaft 2 to provide an annular lubricant storage chamber 6 within the roller, which communicates with the wearing surfaces of the roller bearing 3 as shown in Fig. 1, and which similarly communicates with the wearing surfaces of the other roller bearing, not shown.

An axial contact seal for the lubricant storage chamber 6 comprises a self-contained, axially expansible and contractable seal unit which, as shown in Fig. 1, is installed on the wheel 1 at the axially outer side of the roller bearing 3, and which is shown separately, and in expanded condition, in Fig. 3.

Referring to Fig. 1, the cone 7 of the roller bearing 3 has a radial end surface at its axially outer side, and a sealing ring 8 has a radial sealing surface 9 (Fig. 3) which bears axially against the radial end surface of the bearing cone 7 to establish a substantially fluid tight rotary wipe joint 10 between the bearing cone 7 and the sealing ring 8. The relatively contacting radial sealing surfaces of the bearing cone 7 and of the sealing ring 8, both of which are of steel, are finished to a high degree of precision such as has heretofore been recognized as necessary or desirable for seals of this character.

The wheel 1 has an annular recess at its axially outer side into which is fitted a retainer 11 for the cup 12 of the roller bearing 3, the retainer also serving as a supporting structure for the sealing ring 8 and other parts of the seal unit as shown in Fig. 3, and as will be more fully pointed out hereinbelow. The retainer 11 has a cylindrical radially outer surface which snugly fits into the axial recess of the wheel 1 so as to center the retainer accurately relative to the wheel, and the retainer is detachably secured in position by means of a circumferential series of cap screws 13. A radially inner part of the retainer 11 bears axially against the axially outer end surface of the bearing cup 12, and provisions for axial adjustment of the bearing cup 12 are made by a stack of shims 14 which are interposed between the retainer and the wheel.

The sealing ring 8 is mounted in radially centered, axially movable and circumferentially locked condition on the retainer 11 by means of three steel balls 16 one of which is shown in each of Figs. 1, 3 and 4, and all three of which are shown in Fig. 2. A circumferential series of ball seating radial recesses 17 are formed on and at the outer periphery of the sealing ring 8, and another circumferential series of ball seating radial recesses 18 are formed on and at the inner periphery of the retainer 11 in registering relation, respectively, to the ball seating recesses 17. The ball seating recesses 17 and 18 are preferably formed by drilling the sealing ring and the retainer 11 axially at points spaced 120 degrees apart, the diameter of the drill employed being equal to or slightly larger than the diameter of the ball 16 which is to be seated in the radial recess formed by the drill. Each recess 17 presents a cylindrically concave ball seating surface 19 (Fig. 4) which extends axially of the ring 8, and each recess 18 presents a similar cylindrically concave ball seating surface 21 (Fig. 4) which extends axially of the retainer 11. The radial depths of the recesses 17 and 18 and the diameters of the balls 16 are so proportioned that in the assembled condition of the seal unit as shown in Figs. 1 and 3 the sealing ring will be supported on the retainer for substantially frictionless axial back and forth movement without appreciable radial play, and in accurately centered and circumferentially locked relation to the retainer.

An annular trough casing 22 of stamped or drawn sheet metal is press fitted at its outer periphery into a large cylindrical bore 23 of the retainer 11 at the axially outer side of the latter. A resilient backing unit for the sealing ring 8 is enclosed within the trough casing 22 and comprises an axially expansible and contractable annular skeleton structure 24 of conventional construction, a coil spring 26 which tends to expand the skeleton structure axially, and an inside wrap-around seal boot 27 of rubber like material which seals the sealing ring 8 in axially shiftable relation to the trough casing 22.

In the assembled condition of the parts as shown in Fig. 1 the coil spring 26 is in a state of axial compression, and the sealing surface 9 of the sealing ring bears axially against the complementary sealing surface of the bearing cone 7. The inside diameter of the sealing ring 8 is sufficiently large to afford radial clearance between the ring and the cylindrical shaft portion 28 which mounts the cone 7 of the roller bearing 3. The coil spring 26 will therefore be operative to maintain the sealing ring 8 in proper sealing contact with the complementary sealing surface presented by the bearing cone 7, and the sealing ring 8 is not apt to become stuck in the position in which it is shown in Fig. 1. The bearing cone 7 is accurately fitted upon the cylindrical shaft portion 28, and due to slight deflection of the shaft 2 under load, or due to other causes, it may become necessary for the sealing ring 8 to slightly tilt laterally relative to the retainer 11 in order to maintain proper sealing contact with the bearing cone 7. This requirement is taken care of by the balls 16 which not only support the ring in radially centered, axially shiftable and circumferentially locked condition on the retainer 11 but also permit slight lateral tilting of the sealing ring 8 relative to the retainer 11.

Considering now the condition of the seal unit which is illustrated by Fig. 3, it will be noted that axial expansion of the unit by the pressure of the coil spring 26 is limited by coaction of the sealing ring 8 with the balls 16 and by coaction of the balls 16 with the retainer 11. Each of the ball seating radial recesses 17 in the sealing ring 8 presents a bearing surface 29 (Fig. 4) in forward thrust transmitting relation to the respective ball 16, and each of the ball seating radial recesses 18 in the retainer 11 presents a bearing surface 31 in rearward thrust transmitting relation to the respective ball 16. In other words, axial thrust transmitting means are connected, respectively, with the ring structure 8 and with the supporting structure 11 in straddling relation to the balls 16, so that movement of the ring structure by the backing means 22, 24, 26, 27 in a forward direction, that is toward the complementary sealing surface with which the ring 8 is to cooperate, will be limited by cooperative engagement of the axial thrust transmitting means of the ring structure 8 with the balls 16, and by cooperative engagement of the balls 16 with the axial thrust transmitting means of the supporting structure.

The ball seating recesses 17 and 18 are preferably formed by drilling, as pointed out hereinbefore, and the bearing surfaces 29 and 31 are bottom surfaces of the holes which are formed by said drilling operations.

Fig. 4 illustrates a condition of the seal unit to which it may be adjusted by forcing the sealing ring 8 manually back against the pressure of the coil spring 26. In this condition of the sealing ring 8 the balls 16 may be dropped into the radial ball seating recesses 18 on the retainer 11, and subsequent release of the sealing ring will then entrap the balls in their respective registering pairs of recesses 17 and 18 as illustrated by Fig. 3. Similarly, the balls may be removed from their entrapped positions between the sealing ring 8 and retainer 11 upon backward adjustment of the sealing ring 8 to the ball releasing position in which it is shown in Fig. 4.

After the balls have been removed from their entrapped positions between the sealing ring 8 and the retainer 11 in the manner explained hereinbefore, the sealing ring 8 may be separated from the retainer 11 by axial movement to the right in Fig. 3, the outside diameter of the ring 8 being smaller than the inside diameter of the portion of the retainer 11 which in the assembled condition of the seal unit as shown in Figs. 1 and 3, axially overlaps and is radially spaced from the sealing ring 8.

In order to assemble the seal unit, the sealing ring 8, and the backing unit comprising the sheet metal casing 22, skeleton structure 24, spring 26 and boot 27 may first be assembled to form a subassembly independent of the retainer 11, and such subassembly may then be mounted on the retainer 11 by press fitting the casing 22 into the axial bore 23 of the retainer. The balls 16 may then be installed by forcing the sealing ring 8 to its retracted position in which it is shown in Fig. 4, dropping the balls into the registering pairs of recesses 17 and 18 and then releasing the ring 8 so that it will move to the position in which it is shown in Fig. 3.

Each of the ball seating radial recesses 17 of the sealing ring 8 opens axially opposite to its axial thrust transmitting bearing surface 29, so that when the balls 16 are placed as indicated in Fig. 4 and then dropped into the retainer recesses 18, the cylindrically concave bearing surfaces 19 of the ring 8 may engage the balls upon forward movement of the ring 8 from the position in which it is shown in Fig. 4 to the position in which is shown in Fig. 3.

The assembled seal unit comprising the retainer 11, backing means 22, 24, 26, 27, sealing ring 8, and balls 16, may conveniently be handled prior to and during installation, in asembled condition, on the wheel 1. During such handling and installation, the balls 16 are effective to prevent axial separation of the sealing ring 8 from the retainer 11, and the balls are not apt to become lost accidentally.

In the installed condition of the seal unit as shown in Fig. 1, the axial thrust transmitting bearing surfaces 29, 31 of each pair of registering recesses 17 and 18, are axially spaced from each other a greater distance than the diameter of the ball 16 disposed therebetween, so that the balls will have limited freedom of axial back and forth rolling movement relative to the sealing ring 8 and retainer 11.

It should be understood that it is not intended to limit the invention to the particular forms and details described hereinabove and that the invention includes such other forms and modifications as are embraced by the scope of the appended claims.

It is claimed and desired to secure by Letters Patent:

1. A sealing device of the type in which a series of balls are operatively interposed between a sealing ring structure and a supporting structure so as to mount said ring structure in radially centered, axially movable and circumferentially locked condition on said supporting structure, and in which resilient backing means are operatively interposed between said ring and supporting structures so as to urge said ring structure in axially forward direction relative to said supporting structure; said device comprising axially elongated ball seating radial recesses formed at a uniform radial depth on said ring structure and presenting bearing surfaces at an axial end thereof, respectively, in forward thrust transmitting relation to said balls, and axially elongated ball seating radial recesses formed at a uniform radial depth on said supporting structure and presenting bearing surfaces at an axial end thereof in rearward thrust transmitting relation to said balls, so that movement of said ring structure by said backing means in said forward direction will be limited by cooperative engagement of said bearing surfaces on said ring structure with said balls and by cooperative engagement of said balls with said bearing surfaces on said supporting structure, said ball seating recesses on one of said ring and supporting structures opening axially opposite to their respective axial thrust transmitting bearing surfaces whereby said balls may be moved into and out of the ball seating recesses on the other of said structures upon movement of said ring structure in an axially rearward direction relative to said supporting structure.

2. A sealing device as set forth in claim 1, in which the supporting structure is positioned radially outward with respect to the sealing ring structure, and in which said ball seating recesses are formed at the outer periphery of said sealing ring structure.

3. A sealing device comprising, in combination, a sealing ring having a radially extending end surface for sealing engagement with a complementary sealing surface, a supporting structure having a portion in axially overlapping and radially spaced relation to one of the radially inner and outer peripheries of said sealing ring, resilient backing means operatively interposed between said sealing ring and said supporting structure so as to advance said sealing ring in one direction for cooperative engagement of its sealing surface with said complementary sealing surface, said sealing ring being diametrically dimensioned to permit its axial separation from said supporting structure in said one direction, a first series of axially extending recesses formed on said sealing ring and having a uniform radial depth, a second series of axially extending recesses formed on said supporting structure in radially confronting and registering relation to said first series of recesses and having a uniform radial depth, a circumferential series of balls operatively disposed within registering pairs of said recesses so as to mount said sealing ring in radially centered, axially movable and circumferentially locked condition on said supporting structure, bearing surfaces formed at an axial end wall of said recesses on said sealing ring in forward axial thrust transmitting relation to said balls, respectively, and bearing surfaces formed at an axial end wall of said recesses on said supporting structure in rearward axial thrust transmitting relation to said balls, respectively, so that said axial separation of said sealing ring from said supporting structure will be prevented by cooperative engagement of said bearing surfaces on said sealing ring with said balls and by cooperative engagement of said balls with said bearing surfaces on said supporting structure, said recesses on said sealing ring opening axially opposite to their respective bearing surfaces whereby said balls may be moved into and out of said recesses on said supporting structure upon axial movement of said sealing ring in opposition to said backing means.

References Cited in the file of this patent

UNITED STATES PATENTS

| | | |
|---|---|---|
| 1,208,252 | Westinghouse | Dec. 12, 1916 |
| 1,532,743 | Hadsel | Apr. 7, 1925 |
| 1,763,332 | Sykes | June 10, 1930 |
| 1,972,779 | Kradoska | Sept. 4, 1934 |
| 2,157,597 | Dupree | May 9, 1939 |

FOREIGN PATENTS

| | | |
|---|---|---|
| 626,779 | Great Britain | July 21, 1949 |